United States Patent [19]
Cai

[11] Patent Number: 5,267,506
[45] Date of Patent: Dec. 7, 1993

[54] APPARATUS FOR AUTOMATIC COFFEE BREWING

[76] Inventor: Zhihua Cai, 5900 Bridge Rd., Apt. 416, Ypsilanti, Mich. 48197

[21] Appl. No.: 3,739

[22] Filed: Jan. 13, 1993

[51] Int. Cl.$^5$ ............................................. A47J 31/30
[52] U.S. Cl. ..................................... 99/280; 99/293; 99/295; 99/302 R
[58] Field of Search ................. 99/279, 280, 281, 282, 99/283, 293, 295, 299, 300, 302 R, 307, 316, 323; 426/433

[56] References Cited

U.S. PATENT DOCUMENTS

| | | | |
|---|---|---|---|
| 4,083,295 | 4/1978 | Hollingsworth | 99/283 |
| 4,158,330 | 6/1979 | Vitous | 99/295 |
| 4,457,217 | 7/1984 | Ogawa | 99/295 |
| 4,644,856 | 2/1987 | Borgmann | 99/295 |
| 4,660,466 | 4/1987 | Fries et al. | 99/294 |
| 4,741,260 | 5/1988 | Boliver | 99/279 |
| 4,760,774 | 8/1988 | Lin | 99/299 |
| 4,852,474 | 8/1989 | Mahlich | 99/293 |
| 4,882,982 | 11/1989 | Muttoni | 99/295 |
| 4,882,983 | 11/1989 | Pastrick | 99/295 |
| 5,027,696 | 7/1991 | Antonini | 99/279 |
| 5,115,730 | 5/1992 | Gockelmann | 99/293 |

OTHER PUBLICATIONS

K. Davids, Coffee: A Guide to Buying, Brewing and Enjoying, 1987, pp. 93-96, 99-115, 125-128, 138-145.

*Primary Examiner*—Robert W. Jenkins

[57] ABSTRACT

An apparatus for automatically brewing coffee, tea, or the like comprises a cell for automatically drawing a predetermined amount of water from a water reservoir. A heating unit heats the water in the cell up to boiling and subsequently generates pressurized steam in the cell. The heated water in the cell is forced out of the outlet, which is positioned at the lowest portion of the cell, and delivered under the pressure of the pressurized steam to and through the coffee grounds, tea, or the like in a container. The pressurized steam is released into atmosphere by a valve means before it reaches the coffee grounds, tea, or the like in the container in one embodiment of the present invention and it passes through and drys the wet coffee grounds, tea, or the like in the container in the other embodiment.

19 Claims, 4 Drawing Sheets

APPARATUS FOR AUTOMATIC COFFEE BREWING

FIELD OF THE INVENTION

The present invention relates to apparatus for automatically brewing coffee, tea, or the like. More particularly, the invention relates to apparatus for automatically brewing either a single or multiple servings of high quality coffee in a rapid, convenient, and safe fashion.

BACKGROUND OF THE INVENTION

Coffee brewing apparatus are classified into automatic drip coffee makers and espresso makers according to the means of delivering hot water to and through coffee grounds. Automatic drip coffee makers use the bubble power of boiling water to force little spurts of hot water up a tube and over the top of coffee grounds and the hot water subsequently seeps down through the coffee grounds by gravity. The seeping of hot water by gravity is usually so slow that the coffee may require warming before drinking, especially when a paper filter is used. For that reason, most automatic drip coffee makers have external warming plates. However, as well-known in the art, external warming may deteriorate the flavor and aroma of the brewed coffee.

The slow seeping process also indicates long contact time between water and coffee grounds, which causes more unpleasant chemicals in the coffee grounds to be extracted out into water. Besides, in order to have a reasonable seeping or brewing rate automatic drip coffee makers have to utilize fairly coarse coffee grounds, which causes insufficient extraction of the flavorings in coffee grounds and underutilization and waste of the grounds (U.S. Pat. No. 50276). Furthermore, since the bubbles (i.e. bubbles of steam at or near atmosphere pressure) which deliver the little spurts of hot water over the top of coffee grounds get into contact with the coffee grounds and are then released into atmosphere, certain important aromatic oils may be carried away by the steam from the coffee into atmosphere during the brewing process. Finally, it is well-known in the coffee trade that the quality of coffee diminishes with diminishing brewer size, which may be caused by the relatively greater proportion of filter paper surface to coffee grounds in smaller brewers.

In espresso makers, water is brought into boiling in a reservoir and then delivered under the pressure of steam trapped in the reservoir to and through coffee grounds. During the brewing process, the whole espresso maker including the reservoir is under steam pressure. Thus, the risk of steam pressure hazard is high (U.S. Pat. No. 4,741,260). Also, since the reservoir is under pressure, it can not be refilled during the brewing process. Moreover, one has to be patient to brew espresso since the brewing process will not start until the whole reservoir of water is heated to boiling. A passive solution to the problems mentioned above about espresso makers is to use a mechanical pump to deliver the hot water rather than to use steam pressure. The mechanical pump, however, makes the espresso makers more complicated and expensive.

The present invention provides a coffee brewing apparatus having novel and improved means to deliver water to and through coffee grounds, and is aimed at solving the problems associated with the automatic drip coffee makers and espresso makers.

SUMMARY OF THE INVENTION

In accordance with the present invention there is provided a new apparatus for automatically brewing coffee, tea, or the like. The apparatus comprises a reservoir for storage of a supply of water, a cell for repeatedly drawing a predetermined amount of water from the reservoir and for subsequently heating the water and generating pressurized steam within the cell, automatic steam release valve means for directing the heated water in the cell under steam pressure to and through the coffee grounds, tea, or the like in a container and for releasing the pressurized steam into atmosphere before it reaches the container, and a vessel for receiving the beverages brewed. The cell has an inlet through which water is drawn into the cell from the reservoir and an outlet disposed at the lowest portion of the cell so that the pressurized steam can not reach the outlet until all the water in the cell has been forced out through the outlet by the pressurized steam. The automatic steam release valve means comprises either a film-type automatic steam release valve comprising a hydrophobic porous film through which the pressurized steam can pass but water can not or a float-type automatic steam release valve comprising a float confined in a case operative to move between a first position, in which he float closes an outlet passage for steam on the case, and a second position, in which the float opens the outlet passage.

In accordance with another aspect of the present invention there is provided a new automatic coffee brewing apparatus comprising a reservoir for storage of a supply of water, a container for receiving coffee grounds, tea or the like, a cell for receiving about a single or multiple cups of water from the reservoir and for subsequently heating the water and generating pressurized steam within the cell, and outlet means for directing first the heated water in the cell under steam pressure through the container to extract the flavorings in the coffee grounds and later the pressurized steam through the container to dry the spent coffee grounds. The outlet means comprises an outlet port positioned at the lowest portion of the cell, which outlet port and the cell are constructed in such a manner that the outlet port is always under water as long as there is any water in the cell.

It is thus a primary object of the present invention to provide an apparatus for automatically brewing coffee, tea, or the like.

It is additionally an object of the present invention to provide an apparatus as described above having a novel and improved means for delivering hot water under steam pressure to and through coffee grounds, tea, or the like.

It is also an object of the present invention to provide an apparatus as described above which can use very fine coffee grounds.

It is a further object of the present invention to provide an apparatus as described above which can brew coffee in a fast way so that it is not necessary to warm the coffee before drinking.

It is a further object of the present invention to provide an apparatus in which the high steam pressure hazard is minimized.

It is a further object of the present invention to provide an apparatus as described above in which the water reservoir can be refilled during brewing process.

It is a further object of the present invention to provide an apparatus as described above which requires little waiting time before brewing process starts.

It is a still further object of the present invention to provide an apparatus as described above which can brew either a single or multiple cups of high quality coffee.

These and other objects of the present invention, which will become apparent from the description to follow, are accompanied by the means hereinafter described and claimed.

DESCRIPTION OF THE DRAWING

The drawing illustrates preferred embodiments of the invention, illustrated in further detail in what follows.

DETAILED DESCRIPTION OF THE PREFERRED EMBODIMENTS

Figure 1:
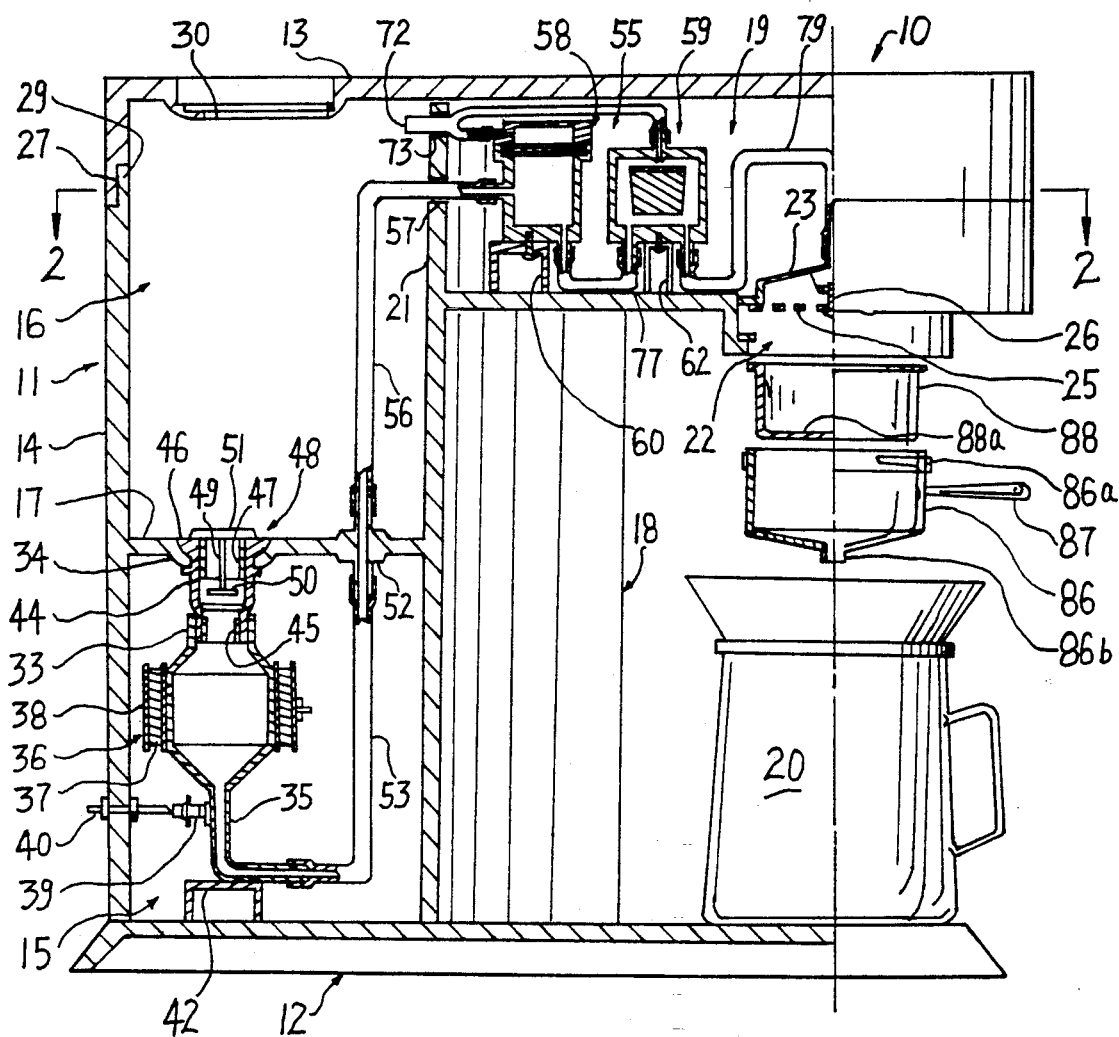
FIG. 1 shows a first exemplary embodiment of the present invention partly in vertical section and partly in a side view, the parts of the apparatus which can be lifted off from one another being shown in the lifted off position.

Referring first to FIG. 1, there is shown an automatic coffee brewing apparatus 10 which embodies one form of the present invention. Only those parts of the apparatus are shown which are necessary for full understanding of the invention. For example, the drawing does not show the means for connecting the apparatus with an electrical source, the electrical conductor which connects the electrically operated parts (including the electrical heater and the control and/or regulating elements). All such parts which are not specifically shown but are necessary in order to render the apparatus fully operative can be similar, analogous or identical to the corresponding parts heretofore conventionally known and used in automatic drip coffee makers and Espresso makers.

Figure 2:
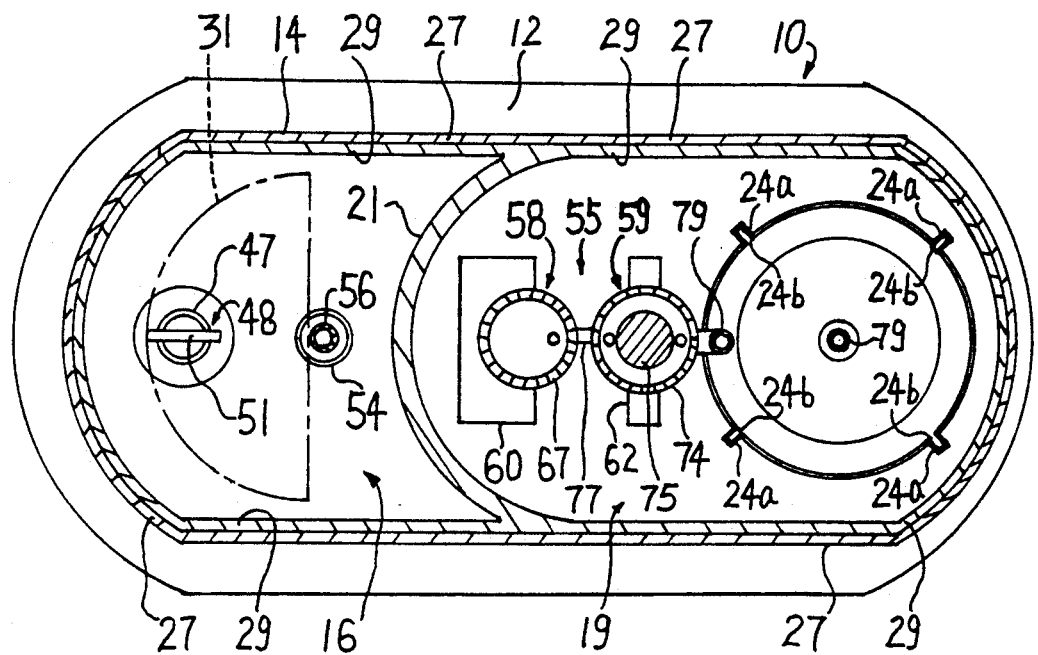
FIG. 2 is a plan view taken along line 2—2 of FIG. 1 showing the water reservoir, the automatic steam release valve means, and the dispenser of the apparatus of the present invention.

The apparatus is shown to comprise a plastic housing 11 having a base 12, a top 13, and a body 14 which is divided into a lower compartment 15 and an upper water reservoir 16 by a generally horizontal partition 17, which compartment 15 and reservoir 16 are formed as a recess 18. Reservoir 16 carries at its top end an upwardly opening chamber 19 positioned above a vessel such as a decanter or cup 20, which chamber 19 is separated from the reservoir by a partition wall 21. A cylindrical opening 22 is formed on the bottom of chamber 19 to receive a hot water dispenser 23, which dispenser 23 is locked into the opening 22 by means 24a and 24b as best seen in FIG. 2. A sieve 25 is fastened to the underside of the dispenser 23 by a bolt 26.

Top 13 is provided with attachment means 27, best illustrated in FIGS. 1 and 2, which allows top 13 to attach to wall 29 at the top end of body 14. Top 13 includes an opening 30 having a freely movable lid 31 (shown in phantom in FIG. 2), which opening 30 provides access to reservoir 16 and opens the reservoir to atmosphere, as best seen in FIG. 1.

A cell 32, being substantially cylindrical in shape, is disposed within compartment 15 for receiving an amount of water which is mainly determined by the cell's size from reservoir 16. It will be appreciated that cell 32 can also be adapted for receiving water from other water sources such as tap water (not shown). cell 32 has a tubular inlet 33 aligned with a downward aperture 34 formed in partition 17 and has a tubular outlet 35 positioned at the lowest portion of the cell. A heater 36, also in substantially cylindrical shape, is secured in heat conducting relation to cell 32 over most of its length between its ends for generating hot water and pressurized steam within the cell. Heater 36 comprises an electrical heating element 37 contained in a sheath 38. Heating element 37 is controlled by a conventional thermostat 39 which is mounted near the outlet 35 of cell 32 in heat conducting relation to the cell. Thermostat 39 may be actuated to an "ON" condition by a manual switch 40 which extends through housing 11. The thermostat is automatically turned to an "OFF" condition as the temperature in cell 32 exceeds a predetermined value. Cell 32 is supported on and may be insulated from base 12 by means such as a bracket 42.

Into the tubular inlet 33 of cell 32 is inserted a connector 44 of heat and pressure resistant rubber or similar material reinforced by an inner rigid tube 45. Connector 44 is shouldered at 46 to be received in the aperture 34 on partition 17, and then reinforced by an inner rigid tube 47. A directional valve 48 comprises a stem 49 passing through tube 47 and bearing at its lower end a valve disc 50. A suitable keeper 51 at the upper end of stem 49 retains the valve within tube 47.

Importantly, the fluid passage between reservoir 16 and cell 32, which consists of the tube 47, connector 44, tube 45, and inlet 33 as well as the spaces between valve disc 50 and connector 44 and between valve disc 50 and the bottom of tube 47, is sufficiently large so that as water is being poured into reservoir 16, it can quickly flow into cell 32 and fill the cell without trapping any significant amount of air within the cell. Also importantly, the overall density of the functional parts of directional valve 48, i.e. disc 50, steam 49, and keeper 51, is close to the density of water, and preferentially smaller than the density of water, so that after the cell is filled with water the disc 50 floats up against the bottom of tube 47 to close or partially close off the cell. It will be appreciated that if the fluid passage between cell 32 and reservoir 16 is not large enough, the cell can not be completely filled with water since the air originally in the cell is trapped between the water at bottom of the cell and the water at the fluid passage. It will also be appreciated that if the overall density of directional valve 48 is not small enough, the fluid passage will remain large after cell 32 is filled with water. Consequently, as steam is generated in cell 32 by heater 36, the pressure of the steam may not be able to cause disc 50 to close off the cell instantly to prevent flow of steam and hot water into reservoir 16. It will be further appreciated that other types of directional valves can be used in the disclosed embodiment.

The tubular outlet 35 of cell 32 is connected to a downward aperture 52 in partition 17 by heat and pressure resistant tubing 53. Importantly, the radii of tubular outlet 35 and tubing 53 are sufficiently small that the amount of water contained in the tubular outlet 35 and tubing 53, which water can not be heated by heater 36, is less than about 10 percent of the amount of water in cell 32. The arrangement and configuration of the cell 32 is such that the pressurized steam generated by heater 36 will accumulate in the space between disc 50 and the surface of water in the cell and subsequently forces the water out of the cell through outlet 35, and that the pressurized steam in the cell can not reach the outlet 35 until all or nearly all the water in the cell has been forced out through the outlet 35 by the pressurized steam.

Figure 3:
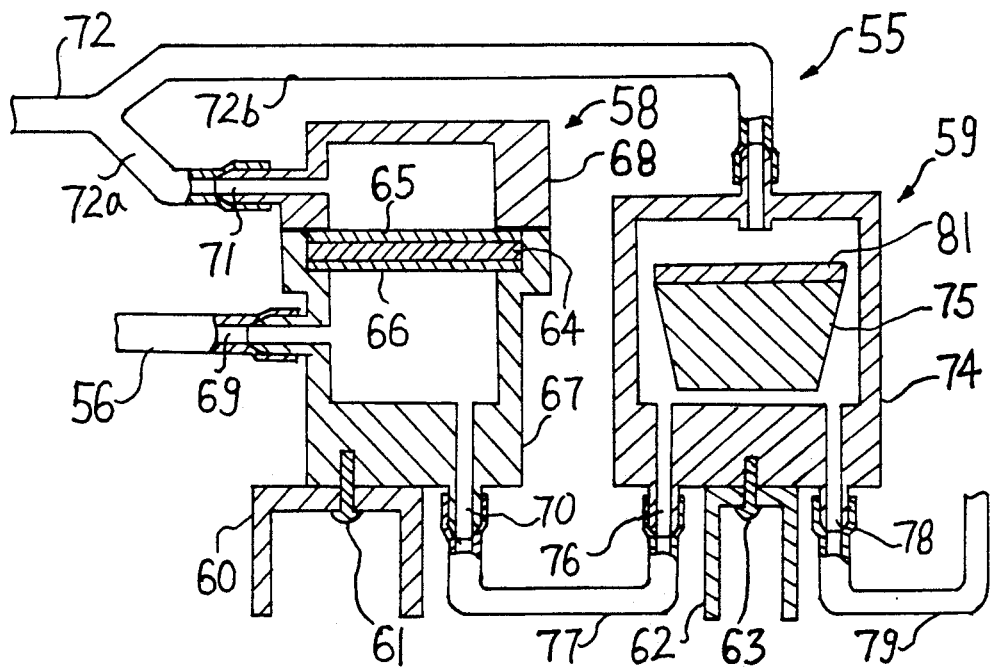
FIG. 3 is an enlarged and vertical section view of the automatic steam release valve means of FIG. 1 which comprises both a film-type automatic steam release valve and a float-type automatic steam release valve.

In direct communication with aperture 52 is an upward aperture 54 formed also in partition 17. Aperture 54 is connected to automatic steam release valve means 55, the function of which valve means 55 will be described below, with heat and pressure resistant tubing 56. Tubing 56 is supported on an opening 57 formed in partition wall 21 between reservoir 16 and chamber 19. In the embodiment of FIG. 1, the valve means 55 comprises a film-type automatic steam release valve 58 and a float-type automatic steam release valve 59 in serial arrangement, which is best seen in FIGS. 1 and 3. The valves 58 and 59 are supported on the bottom of chamber 19 by means such as a bracket 60 and bolt 61 and a bracket 62 and bolt 63, respectively.

The film-type automatic steam release valve 58 comprises a hydrophobic porous film 64 supported on both its upper and lower surfaces by screens or other mechanical supports 65 and 66, respectively, as best seen in FIG. 3, to prevent rupture or displacement of the film during service. The porous film 64 and supports 65 and 66 are sealed between a lower compartment 67 and an upper compartment 68 by means such as thermal sealing. The porous hydrophobic film 64 is comprised of hydrophobic materials such as polytetrafluoroethylene. The hydrophobic nature of porous film 64 causes the film to repel (or stop) water but allows steam to pass through the film with little resistance. The porosity of the film 64 is in the range of 0.01 $\mu$m to 30 $\mu$m, and preferentially in the range of 0.05 $\mu$m to 2 $\mu$m. The holes on screens 65 and 66, especially on screen 66, should be sufficiently large to not retain any water when the screens are lifted out of water.

A tubular inlet 69 is formed at the lower compartment 67 of the valve 58 to receive the heat and pressure resistant tubing 56. On the bottom of the lower compartment 67 is formed a liquid outlet 70, which is connected to the adjacent float-type automatic steam release valve 59. A steam outlet 71 is formed on the upper compartment 68 and is connected to the shorter leg 72a of a Y-shaped tube 72, which tube 72 is extended into reservoir 16 through an opening 73 in the partition wall 21, as best seen in FIG 1. The arrangement of the film-type automatic steam release valve 58 is such that the hot water from cell 32 enters the valve 58 at inlet 69 and exits at liquid outlet 70, and that all or most of the steam from the cell passes through the porous film 64 and exits at steam outlet 71 into reservoir 16.

The float-type automatic steam release valve 59 comprises a substantially cylindrical case 74 adapted to receive a float 75 which is comprised of heat resistant materials having overall density close to that of water, and preferentially smaller than the density of water. On the bottom of case 74 are formed a tubular inlet 76, which is connected to the liquid outlet 70 of the valve 58 with heat and pressure resistant tubing 77, and a liquid outlet 78, which is connected to dispenser 23 with heat and pressure resistant tubing 79. A steam outlet 80 is formed on the top of case 74, which outlet 80 is extended a little downward into the interior of the case. The radius of the steam outlet 80 should be small enough to avoid the float 75 being pressed onto the steam outlet by the high steam pressure in case 74. In this respect, a bigger float (thus heavier at a given average density of the float) can allow higher steam pressure in case 74 and/or steam outlet 80 with larger radius without causing the float being pressed onto the steam outlet by the steam pressure in the case. A disc 81 of heat resistant soft materials such as rubber is attached to the top of float 75 by means such as glue to assure complete closure of the steam outlet 80 when the float is risen up by water against the steam outlet 80. The steam outlet 80 is connected to the top portion of reservoir 16 through the longer leg 72b of the Y-shaped tube 72. The arrangement is such that as the hot water from the valve 58 enters the valve 59 the float 75 floats up and subsequently closes the steam outlet 80, thus allowing the hot water to exit the valve 59 only through the liquid outlet 78, and that as the steam from the valve 58 enters the valve 59 the float sinks to the bottom of case 74 due to the lack of buoyancy force on the float in steam and subsequently opens the steam outlet 80, thus allowing the steam to exit the valve 59 at steam outlet 80 into reservoir 16 through the longer leg 72b of the Y-shaped tube 72 rather than to exit at the liquid outlet 78 into vessel 20 through the more restrictive wet coffee grounds.

Figure 4:
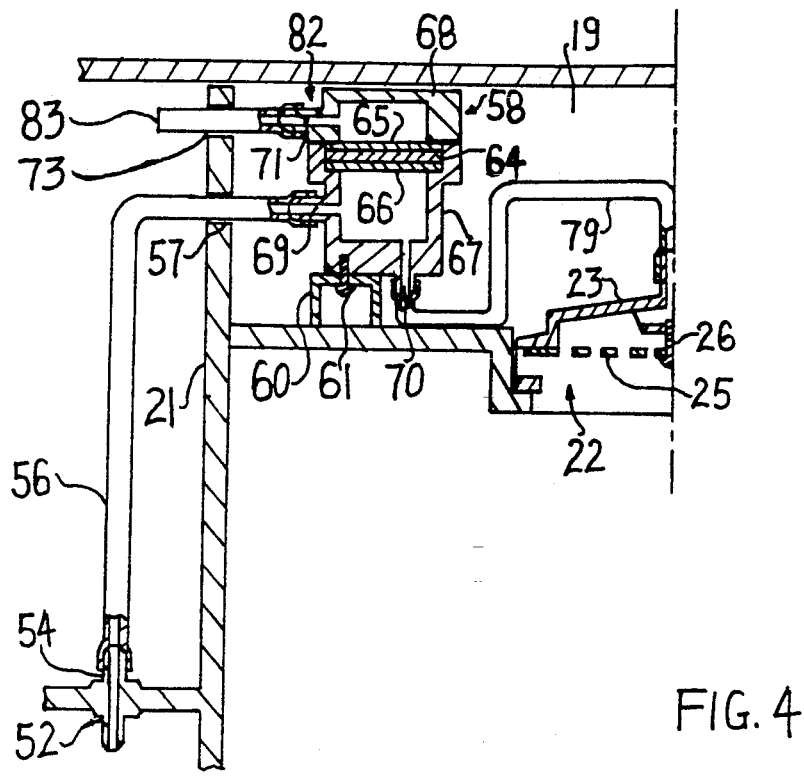
FIG. 4 is a vertical section view of an alternative to the automatic steam release valve means of FIG. 1, which alternative comprises only the film-type automatic steam release valve.

While the automatic steam release valve means 55 shown in FIGS. 1-3 is comprised of both the film-type automatic steam release valve 58 and the float-type automatic steam release valve 59, it will be appreciated that the valve means 55 can be fully operative with only one of the valves 58 and 59, or with any other combinations of valves 58 and 59. An alternative 82 (FIG. 4) to the valve means 55 of FIG. 1 comprises only the film-type automatic steam release valve 58. In FIG. 4, the inlet 69 of the valve 58 is connected directly to aperture 54 with tubing 56 and the liquid outlet 70 directly to the dispenser 23 with tubing 79. The steam outlet 71 of the valve 58 is connected into reservoir 16 with tubing 83 through the opening 73 in partition wall 21. The arrangement is such that the hot water forced out of cell 32 by the pressurized steam in the cell is directed to dispenser 23 by the valve 58 and that the pressurized steam from the cell passes through the porous film 64 of the valve 58 and is subsequently released into reservoir 16 or atmosphere through tubing 83.

Figure 5:
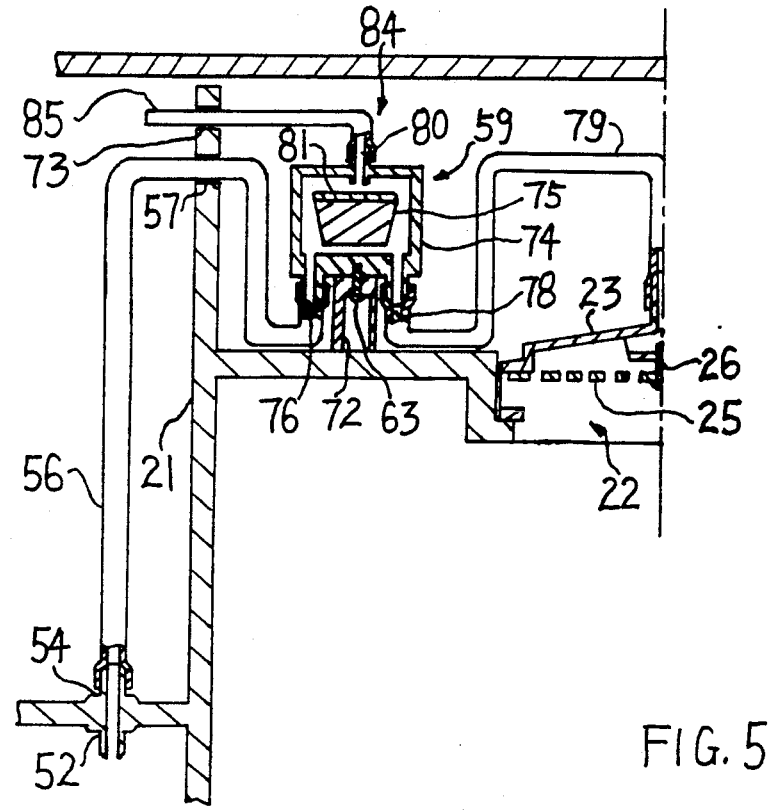
FIG. 5 is a vertical section view of another alternative to the automatic steam release valve means of FIG. 1, which alternative comprises only the float-type automatic steam release valve.

Another alternative 84 (FIG. 5) to the valve means 55 of FIG. 1 comprises only the float-type automatic steam release valve 59. In FIG. 5, the inlet 76 of the valve 59 is connected directly to aperture 54 with tubing 56, and the liquid outlet 78 directly to dispenser 23 with tubing 79. The steam outlet 80 of the valve 59 is connected into reservoir 16 by tubing 85 through the opening 73 in partition wall 21. The arrangement is such that as the hot water which is forced out of cell 32 by the pressurized steam enters the valve 59, the float 75 floats up and subsequently closes the steam outlet 80, thus directing the hot water to the dispenser 23 through the liquid outlet 78 and tubing 79, and that as the pressurized steam from the cell 32 enters the valve 59 the float sinks to the bottom of case 74 due to the lack of buoyancy force on the float in steam and subsequently opens the steam outlet 80, thus directing the pressurized steam into reservoir 16 through steam outlet 80 and tubing 85 rather than into vessel 20 through the liquid outlet 78 and the more restrictive wet coffee grounds.

A container 86 can be connected in a leak-proof manner to the underside of the dispenser 23 by means of a bayonet fastening 86a. The container 86 has a handle 87, by means of which it can be rotated about its axis and the bayonet fastening 86a consequently tightened against the dispenser 23. The container 86 is funnel-shaped at the bottom and is provided with an outflow orifice 86b. A sieve 88, the bottom 88a of which is designed as a fine sieve or designed to be able to receive a filter disc, can be inserted into the container 86.

Figure 6:
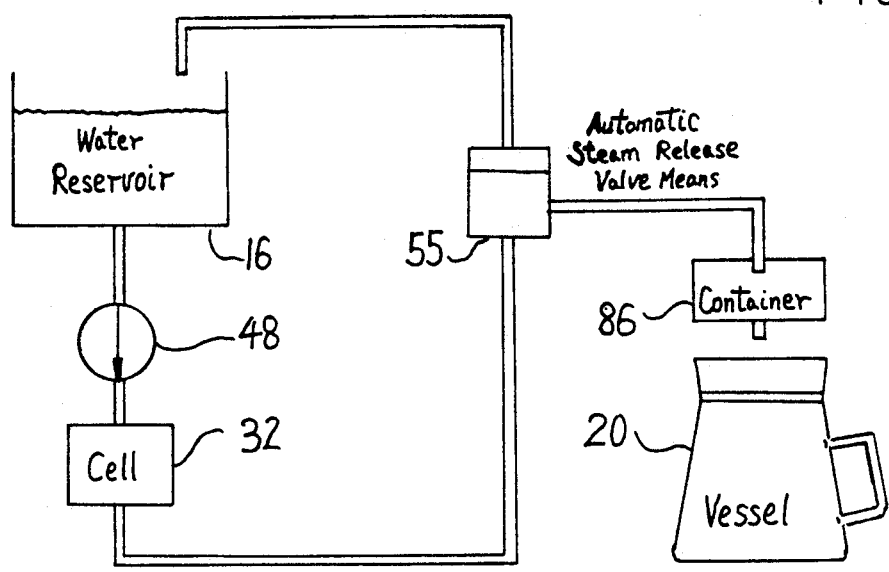
FIG. 6 is a functional schematic of the apparatus of FIG. 1.

The general operation of the embodiment disclosed above is as shown in FIG. 6. The sieve 88 is filled with coffee grounds, placed in container 86, and connected in a leak-proof manner to dispenser 23. The reservoir 16 is filled with water and vessel 20 is positioned to receive the brew. Due to the presence of water head in reservoir 16, water is drawn into cell 32 from reservoir 16 through directional valve 48. The heater 36 then heats the water in cell 32 and generates pressurized steam in the cell. Under the pressure of pressurized steam, the heated or hot water in cell 32 is forced out of the cell into the vessel 20 through the automatic steam release valve means 55 and the coffee grounds in container 86. After all the hot water has been forced out of cell 32, the pressurized steam itself starts to flow out of the cell and is released into reservoir 16 or atmosphere through the valve means 55. Upon releasing the pressurized steam, the pressure in cell 32 reaches atmosphere. Subsequently, the water head in reservoir 16 causes cell 32 to be re-filled with water from the reservoir. Again, the water in the cell is heated up and delivered through the coffee grounds in container 86 into vessel 20 by pressurized steam, and the steam is released through the valve means 55 into reservoir 16. The process described above will repeat until the apparatus 10 is manually turned off or until the reservoir 16 runs dry, which causes the temperature of the cell 32 to rise to a predetermined value of the thermostat 39 to shut off the heater 36. This operation will now be described in more detail.

Apparatus 10 normally sits on some horizontal surface and is plugged into an electric outlet with the manual switch 40 at "OFF" position. A predetermined amount of very finely grounded coffee sufficient to brew a single or multiple cups of coffee is placed in the sieve 88 and then slightly pressed. If desired, a conventional coffee filter can be inserted into the sieve 88 before filling the sieve with coffee grounds. The sieve 88 is placed into the container 86 and connected in a leak-proof manner to dispenser 23 by means of handle 87. Vessel 20 for receiving the brew is positioned adjacent to body 14 and reservoir 16 is filled with water through the opening 30 on top 13. The reservoir can be refilled anytime during the brewing process. Manual switch 40 is then pressed to an "ON" position, which in turn actuates the thermostat 39 and provides electric current to heating element 37.

Due to the water head in reservoir 16, water flows past directional valve 48 into cell 32 until it is full. The heating element 37 heats the water in cell 32 up to boiling and subsequently generates pressurized steam in the cell, which steam accumulates in the space between the disc 50 of directional valve 48 and the surface of boiling water. The steam pressure above the water in cell 32 produces a directional flow of heated or hot water out of the outlet 35 of cell 32 toward the automatic steam release valve means 55. In this respect, directional valve 48 restricts flow of pressurized steam and water into reservoir 16. The hot water enters the film-type automatic steam release valve 58 of the valve means 55 and exits the valve 58 only through liquid outlet 70 since the hydrophobic porous film 64 repels water. As the hot water enters the float-type automatic steam release valve 59, the float 75 floats up and subsequently closes the steam outlet 80, thus causing the heated water to exit through the liquid outlet 78 of the valve 59. Under the steam pressure, the hot water then runs down dispenser 23, through the coffee grounds in container 86, and into vessel 20.

After all the hot water in cell 32 is forced out of the outlet 35 by pressurized steam, the steam itself starts to flow out of the cell into the automatic steam release valve means 55. At the valve 58 of the valve means 55, all or most of the steam from cell 32 passes through the porous film 64 into the upper compartment 68 and is subsequently released into reservoir 16 or atmosphere through the steam outlet 71. The steam which has not been released at the valve 58, if there is any, enters the float-type automatic release valve 59 of the valve means 55. As the water in the case 74 of the valve 59 is replaced by steam, float 75 sinks to the bottom of the case due to the lack of buoyancy force on the float in steam and subsequently opens the steam outlet 80. The steam is, therefore, released through the steam outlet 80 into reservoir 16 or atmosphere. (The steam will not exit through the liquid outlet 78 of the valve 59 into vessel 20 since the wet coffee grounds in container 86 restrict the flow of steam.)

Quickly, the pressure in cell 32 reaches the pressure in reservoir 16 or atmosphere. Therefore, the water head in reservoir 16 causes water to flow past directional valve 48 into cell 32. As the cold water flows into the cell 32 from reservoir 16, the temperature of the cell is lowered by the cold water, which causes the steam in the cell to condense into liquid and subsequently creates a certain degree of vacuum in the cell. The vacuum in the cell draws water very quickly from the reservoir into the cell until the cell is full. Again, the water in cell 32 is heated up and delivered under steam pressure through the coffee grounds in container 86, and the steam is released through the valve means 55 as described above. The process described above will repeat until the apparatus 10 is manually turned off or the reservoir 16 runs dry, which causes the temperature of the cell 32 to rise to a predetermined value of the thermostat 39 to shut off the heating element 37. Moreover, if the apparatus is turned off manually, it is preferred to turn off the apparatus immediately after the pressurized steam is released through the automatic steam release valve means 55 since at this moment the wet coffee grounds in container 86 has been somewhat drained by the pressurized steam.

A unique feature of the embodiment as disclosed above is that the coffee brewing rate is primarily determined by the rate of heating the water and generating steam in the cell 32, and is thus relatively insensitive to the coarseness or fineness of the coffee grounds. As a consequence, the disclosed embodiment can utilize coffee grounds of various fineness without much alteration in brewing rates, thus in the taste of the coffee brewed. In the case that very fine coffee grounds are used, the extraction of flavoring materials from the grounds by the hot water is thorough, thus avoiding underutilization and wasting of the coffee grounds.

Another feature of the disclosed embodiment is that the heated water is delivered under steam pressure through the coffee grounds, therefore, the brewing rate is high even if a paper filter with small filtration area is used. The high brewing rate makes it unnecessary to warm the brewed coffee with external heating plates, thus avoiding deteriorating the aroma and flavor in the coffee. When a filter with small filtration area is used, the loss of flavorful oils due to adsorption to the paper filter surfaces is minimized, thus making it possible to brew a single cup of high quality coffee with the disclosed embodiment.

The third unique feature of the embodiment disclosed above is that only the water in cell 32, the amount of which water is very small compared to the amount of water in reservoir 16, is heated and delivered under steam pressure during the brewing process. The risk of high pressure hazards is, therefore, minimized. Also, since it takes little time to heat the small amount of water in cell 32, the disclosed embodiment can start brewing coffee almost instantly after being turned on. Moreover, since reservoir 16 is always under atmosphere, it can be refilled during the brewing process. Finally, the construction of the disclosed embodiment could prevent certain important aromatic oils from escaping into the air during the brewing process. This feature is achieved by the leak-proof connection between the dispenser 23 and the container 86 and by the fact that only hot water is delivered to the coffee grounds. (The steam that may carry the aromatic oils away from coffee into air is released into atmosphere at the valve means 55 before reaching the coffee grounds.)

Figure 7:
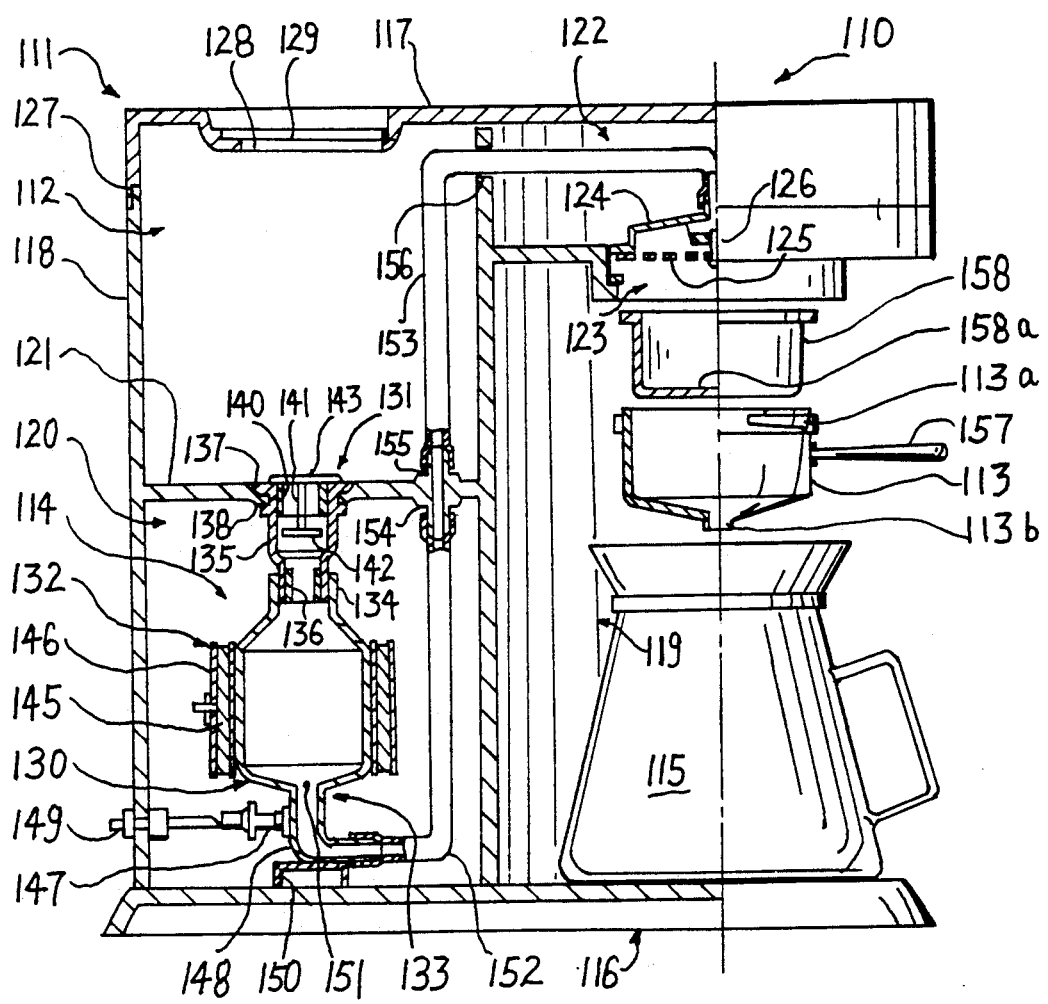
FIG. 7 shows a second exemplary embodiment of the present invention, in part similar to the first exemplary embodiment, partly in vertical section and partly in a side view, the parts of the apparatus which can be lifted off from one another being shown in the lifted off position.

An apparatus 110 for brewing coffee, tea or the like constructed in accordance with another embodiment of the present invention is shown in FIG. 7. The apparatus 110 comprises a housing 111, a reservoir 112 for storage of a supply of water, a container 113 for receiving coffee grounds, tea leaves, or the like, a steam generator 114 for receiving a predetermined amount of water, preferentially about a single or multiple cups of water, from reservoir 112 and for subsequently heating the water in the steam generator and delivering the heated water under steam pressure to and through the container 113, and a vessel such as a cup or decanter 115 for receiving the brewed beverage.

The housing 111 has a base 116, a top 117, and a body 118 similar to the embodiment of FIGS. 1-3. The body 118 is formed as a recess 119 to receive vessel 115 and is divided by a partition 121 into reservoir 112 and a lower compartment 120 to house the steam generator 114. Reservoir 112 carries at its top end an upwardly opening chamber 122 positioned directly above vessel 115. On the bottom of chamber 122 is formed a cylindrical opening 123 into which a hot water dispenser 124 is disposed. The dispenser 124 is mounted to the bottom of chamber 122 in a manner similar to the embodiment of FIGS. 1 and 2 and, for that reason, the associated mounting means has not been illustrated. A sieve 125 is fastened to the underside of the dispenser 124 by a bolt 126. The top 117, also similar in construction to the embodiment of FIGS. 1 and 2, is provided with attachment means 127, which allows the top 117 to attach to reservoir 112 and chamber 122. The top 117 comprises an opening 128 having a freely movable lid 129, which opening 128 provides access to reservoir 112 and opens the reservoir to atmosphere.

The steam generator 114 comprises a generally cylindrical cell 130 for receiving an amount of water determined mainly by the cell's size, preferentially about a single or multiple cups of water, from reservoir 112, a directional valve 131 positioned between cell 130 and reservoir 112 for preventing flow of fluid from the cell to the reservoir, a heater 132 for generating hot water and pressurized steam within the cell, and outlet means 133 for directing first the hot water and later the steam in cell 130 to the coffee grounds, tea, or the like in container 113. It will be appreciated that cell 130 can also be adapted for receiving about a single or multiple cups of water from water sources other than a reservoir, such as tap water (not shown).

The directional valve 131 is connected between the reservoir 112 and cell 130 in a manner similar to the embodiment of FIG. 1. Into the tubular inlet 134 of cell 130 is inserted a connector 135 of heat and pressure-resistant rubber or similar material reinforced by an inner rigid tube 136. Connector 135 is shouldered at 137 to be received in a downward aperture 138 formed in partition 121, and then reinforced by an inner rigid tube 140. directional valve 131 comprises a stem 141 passing through tube 140 and bearing at its lower end a valve disc 142. A suitable keeper 143 at the upper end of stem 141 retains the valve within tube 140. Importantly, the fluid passage between cell 130 and reservoir 112, which is comprised of the inlet 134, connector 135, tube 136, and tube 140 as well as the spaces between valve disc 142 and connector 135 and between valve disc 142 and the bottom of tube 140, is sufficiently large so that as water is being poured into cell 130, it can quickly flow into the cell and fill the cell without trapping any significant amount of air within the cell. Also importantly, the overall density of the functional parts of directional valve 131, i.e. disc 142, steam 141, and keeper 143 is close to the density of water, and preferentially smaller than the density of water, so that after the cell is filled with water the disc 142 floats up against the bottom of tube 140 to close or partially close off the cell. It will be appreciated that if the overall density of directional valve 131 is not small enough, the fluid passage between cell 130 and reservoir 112 will remain large after cell 130 is filled with water. Consequently, as steam is generated in cell 130 by heater 132, the pressure of the steam may not be able to cause disc 142 to close off the cell instantly to prevent flow of steam and hot water into reservoir 112.

Heater 132 is secured in heat conducting relation to cell 130 over most of its length between its ends, and comprises an electrical heating element 145 contained in a sheath 146. Heating element 145 is controlled by a conventional thermostat 147 which is secured in heat conducting relation to the outlet tube 148 of outlet means 133. Thermostat 147 can be actuated to an "ON" condition by a manual switch 149 which extends through housing 111. The thermostat is automatically turned to an "OFF" condition as the temperature in cell 130 or at the outer wall of outlet tube 148 exceeds a predetermined value. The steam generator 114 is supported on and may be insulated from base 116 by means such as a bracket 150.

The outlet means 133 of steam generator 114 is positioned at the bottom or at the lowest portion of cell 130 so that the outlet port 151 of the outlet means is under water as long as there is any water in the cell. The outlet tube 148 of outlet means 133 is connected to hot water dispenser 124 with heat and pressure resistant tubings 152 and 153, which tubings 152 and 153 are connected together through the interconnected downward aperture 154 and upward aperture 155 formed on partition 121. Tubing 153 is supported on the opening 156 in the wall between chamber 122 and reservoir 112. Importantly, the radii of outlet tube 148 and tubings 152 and 153 are sufficiently small that the amount of water contained in the outlet tube 148 and tubings 152 and 153, which water can not be heated by heater 132, is less than about 10 percent of the amount of water in cell 130. The arrangement is such that as the steam is generated by heater 132 and accumulated between the disc 142 of directional valve 131 and the surface of hot water in cell 130, hot water is forced out of the cell into vessel 115 by the steam pressure through the outlet tube 148, tubings 152 and 153, dispenser 124, and container 113. Only after all or nearly all of the hot water in cell 130 has been forced out by the steam, the steam itself starts to flow out of the cell into atmosphere through the outlet tube 148, tubings 152 and 153, and container 124 and subsequently drys the spent coffee grounds in the container.

An alternative (not shown) to the cell 130 has an additional steam pipe, one end of which pipe opens into the interior of the cell in such a way that it can be reached by steam as soon as steam is formed in the cell, and the other end of which pipe opens into a region outside the housing 111 and is connected to a valve which can open and close the steam pipe to a greater or lesser extent. This alternative cell with a steam pipe as described herein can supply dry steam which may be used, for example, to heat and foam up milk and soup.

The container 113 can be connected in a leak-proof manner to the underside of the dispenser 124 by means of a bayonet fastening 113a. The container 113 has a handle 157, by means of which it can be rotated about its axis and the bayonet fastening 113a consequently tightened against the dispenser 124. The container 113 is funnel-shaped at the bottom and is provided with an outflow orifice 113b. A sieve 158, the bottom 158a of which is designed as a fine sieve or designed to be able to receive a conventional paper filter disc, can be inserted into the container 113.

Referring now to the operation of the apparatus 110, to produce coffee using the embodiment disclosed, a predetermined amount of finely grounded coffee sufficient to brew a single or multiple cups of coffee is placed in the sieve 158 and then slightly pressed. If desired, a conventional coffee filter can be inserted into the sieve 158 before filling the sieve with coffee grounds. The sieve 158 is placed into the container 113 and connected in a leak-proof manner to the dispenser 124 by means of handle 157. A decanter or a cup 115 for receiving the brew to be produced is positioned adjacent to body 118 in recess 119. Reservoir 112 is filled with water through the opening 128 on the top 117.

As water is being poured into reservoir 112, the water head in the reservoir causes water to flow quickly past directional valve 131 into cell 130 until the cell is full. The cell 130 now contains about a single or multiple cups of water depending on the size of the cell. Manual switch 149 is then pressed to an "ON" position. The heating element 145 heats the water in cell 130 up to boiling, and subsequently generates pressurized steam in the cell, which steam accumulates in the space between the disc 142 of directional valve 131 and the surface of boiling water. The steam pressure above the boiling water in cell 130 produces a directional flow of heated water out of the cell through outlet tube 148 toward hot water dispenser 124. In this respect, directional valve 131 restricts flow of water and pressurized steam into reservoir 112. After all or nearly all the water in cell 130 is forced out through outlet tube 148 by the pressurized steam, the steam itself starts to flow out of the cell through the outlet tube 148 toward dispenser 124. When the pressurized steam reaches the wet coffee grounds it pushes the water in the wet coffee grounds downward. After the water has all been pushed through the coffee grounds a low resistance path for steam exists there, and the steam passes downward and out through orifice 113b at the bottom of container 113, warming and drying the spent coffee grounds as it does so. Meanwhile, since there is no water left in cell 130, heating element 145 rapidly heats the cell to a predetermined temperature at which thermostat 147 shall kick out (turn off) the electrical current to the heating element 145.

After all steam passes through the spent coffee grounds the grounds has been partially dried, and when the container is removed to discard the spent coffee grounds, no unwelcome dripping occurs. Subsequently, the pressure in cell 130 reaches the atmosphere pressure and the water head in reservoir 112 causes water to flow into cell 130 from the reservoir. As the cold water flows into the cell 130 from reservoir 112, the temperature of the cell is lowered, which causes the steam in the cell to condense into liquid and subsequently creates a certain degree of vacuum in the cell. The vacuum in the cell draws water very quickly from the reservoir 112 into the cell until the cell is filled with water. Now, a single or multiple cups of coffee has been brewed and the apparatus is ready for brewing another single or multiple cups of coffee, if desired.

An important advantage of the apparatus 110 is that the pressure in reservoir 112 is always at atmosphere pressure, which greatly reduces the high steam pressure hazards as well as makes it possible to re-fill reservoir 112 during the brewing process. Furthermore, since the amount of coffee brewed in one brewing cycle is always equal to the amount of water in the cell 130, which cell is adapted to accommodate about a single or multiple cups of water, it is not necessary to measure exactly how much water to add into the reservoir 112.

Another important advantage of the apparatus 110 is that at the end of each brewing cycle, dry steam passes through the spent wet coffee grounds and dries the latter so that subsequent removal of the ground coffee container 113 is substantially drip-free.

The foregoing is considered as illustrative only of the principles of the invention. Further, since numerous modifications and variations will readily occur to those skilled in the art, it is not desired to limit the invention to the exact construction and operation shown and described, and accordingly, all suitable modifications and equivalents may be resorted to, falling within the scope of the present invention.

What is claimed is:

1. An apparatus for automatically brewing coffee, tea, or the like comprising:
    a housing;
    a container for receiving coffee grounds, tea, or the like;
    a vessel for receiving the brewed coffee, tea, or the like;
    a reservoir for storage of a supply of water;
    a cell for receiving water from said reservoir, said cell being in thermally conducting relation to a heater for generating hot water and pressurized steam within said cell, and said cell having outlet means positioned at the lowest portion of said cell so that said pressurized steam can not reach said outlet means until all or nearly all of said hot water in said cell has been forced out through said outlet means by said pressurized steam;
    means for filling said cell with water from said reservoir and for preventing reverse flow of fluid from said cell to said reservoir; and
    valve means positioned between said cell and said container, said valve means having inlet means for said hot water and said pressurized steam coming from said cell, liquid outlet means for directing said hot water under steam pressure to and through the coffee grounds, tea, or the like in said container, and steam outlet means for releasing said pressurized steam into atmosphere or said reservoir.

2. An apparatus as defined in claim 1 wherein said reservoir communicates with atmosphere, and the pressure within said reservoir is always at or near atmosphere.

3. An apparatus as defined in claim 1 wherein said container is connected in a leak-proof manner to a water dispenser mounted to said housing.

4. An apparatus as defined in claim 1 wherein said means comprising a sufficiently large fluid passage between said cell and said reservoir to avoid trapping any significant amount of air within said cell when water flows into said cell from said reservoir and a directional valve in said fluid passage, the overall density of the functional parts of said directional valve being smaller than the density of water.

5. A structure according to claim 1 in which said cell is generally cylindrical in shape.

6. An apparatus for automatically brewing coffee, tea, or the like comprising:
    a housing;
    a container for receiving coffee grounds, tea, or the like;
    a vessel for receiving the brewed coffee, tea, or the like;
    a reservoir for storage of a supply of water;
    a cell for receiving water from said reservoir;
    means for filling said cell with water from said reservoir and for preventing reverse flow of fluid from said cell to said reservoir;
    a heater in thermally conducting relation to said cell for generating hot water and pressurized steam within said cell; and
    valve means for releasing said pressurized steam from said cell into atmosphere or said reservoir, said valve means including inlet means for said hot water which is forced out of said cell by said pressurized steam and for said pressurized steam coming from said cell, liquid outlet means for directing said hot water under steam pressure to and through the coffee grounds, tea, or the like in said container, and steam outlet means for releasing said pressurized steam into atmosphere or into said reservoir.

7. An apparatus as defined in claim 6 wherein said valve means further includes a hydrophobic porous film through which said pressurized steam can pass with little resistance but said hot water can not.

8. An apparatus as defined in claim 6 wherein said valve means further includes a float confined in a case which is operative to move between a first position, in which said float closes said steam outlet means in said case, and a second position, in which said float opens said steam outlet means.

9. An apparatus as defined in claim 6 wherein said reservoir communicates with atmosphere, and the pressure within said reservoir is always at or neat atmosphere.

10. In an apparatus for automatically brewing coffee, tea, etc., said apparatus having means for heating water and delivering the hot water under steam pressure to a utilization device, said means comprising:
    a cell for receiving water from a water source;
    means for filling said cell with water from said water source and for preventing reverse flow of fluid from said cell to said water source;
    a heater in thermally conducting relation to said cell for generating hot water and pressurized steam within said cell; and
    valve means for directing said hot water which is force out of said cell by said pressurized steam to a utilization device and for releasing said pressurized steam into atmosphere or said water source, said valve means comprising either a film-type automatic steam release valve which has a hydrophobic porous film through which said pressurized steam can pass with little resistance but said hot water can not, or a float-type automatic steam release valve which has a float confined in a case operative to move between a first position, in which said float closes an outlet passage for said pressurized steam in said case, and a second position, in which said float opens said outlet passage, or both said film-type automatic steam release valve and said float-type automatic steam release valve.

11. A structure according to claim 10 in which said heater is electrically energizable.

12. The structure of claim 10 in which said cell has an outlet positioned at the lowest portion of said cell so that said pressurized steam can not reach said outlet until all or nearly all of said hot water in said cell has been forced out of said cell through said outlet by said pressurized steam.

13. An apparatus for brewing coffee, tea, or the like comprising:
    a housing;
    a container for holding coffee grounds, tea, or the like;
    a vessel for receiving the brewed beverage;
    a reservoir for storage of a supply of water;
    a cell for receiving about a single or multiple cups of water from said reservoir, said cell being in thermally conducting relation to a heater for generating hot water and pressurized steam within said cell, and said cell adapting such a configuration that said pressurized steam can be accumulated above said hot water in said cell;

means for filling said cell with water from said reservoir and for preventing passage of said pressurized steam and hot water from said cell to said reservoir; and outlet means for delivering first said hot water under the pressure of said pressurized steam and later said pressurized steam in said cell to and through the coffee grounds, tea, or the like in said container, said outlet means comprising an outlet port positioned at the lowest portion of said cell so that said outlet port is always under water as long as there is any water in said cell.

14. An apparatus as defined in claim 13 further comprising switch means for automatically turning off said heater after all of said hot water in said cell has been delivered to said container, said switch means comprising a thermostat which is thermally operable to turn off said heater at a predetermined temperature of said cell.

15. An apparatus as defined in claim 13 wherein said reservoir is in direct communication with atmosphere, and the pressure within said reservoir is always at or near atmosphere.

16. An apparatus as defined in claim 13 wherein said cell is generally cylindrical.

17. In an apparatus for brewing coffee, tea, or the like, said apparatus having a steam generator energizable to deliver hot water under steam pressure to a utilization device, said steam generator comprising:

a cell for receiving water from a water source, said cell being in thermally conducting relation to a heater for generating hot water and pressurized steam within said cell, and said cell adapting such a configuration that said pressurized steam can be accumulated above said hot water in said cell;

means for filling said cell with water from said water source and for preventing passage of said hot water and said pressurized steam from said cell to said water source, said means comprising a sufficiently large fluid passage between said cell and said water source to avoid trapping any significant amount of air within said cell when water flows into said cell from said water source and a directional valve in said fluid passage, the overall density of the functional parts of said directional valve being smaller than the density of water;

and outlet means for said hot water and pressurized steam in said cell, said outlet means having an outlet port positioned at or near the lowest portion of said cell.

18. A steam generator as defined in claim 17 wherein said heater is electrically energizable.

19. A steam generator as defined in claim 17 wherein said water reservoir communicates with atmosphere, and the pressure within said water reservoir is always at or near atmosphere.

* * * * *